US012753709B1

(12) United States Patent
St-Laurent

(10) Patent No.: US 12,753,709 B1
(45) Date of Patent: Oct. 6, 2026

(54) BREATHER SYSTEM FOR AIRCRAFT ENGINE

(71) Applicant: PRATT & WHITNEY CANADA CORP., Longueuil (CA)

(72) Inventor: Gabriel St-Laurent, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/369,800

(22) Filed: Oct. 27, 2025

(51) Int. Cl.
*F01D 25/18* (2006.01)

(52) U.S. Cl.
CPC ...... *F01D 25/183* (2013.01); *F05D 2220/323* (2013.01); *F05D 2260/6022* (2013.01); *F05D 2260/606* (2013.01)

(58) Field of Classification Search
CPC ............. F01D 25/183; F05D 2220/323; F05D 2260/6022; F05D 2260/606; F01M 13/023
See application file for complete search history.

(56) References Cited

U.S. PATENT DOCUMENTS

| | | | | |
|---|---|---|---|---|
| 4,037,991 | A * | 7/1977 | Taylor | F04F 5/466 417/89 |
| 8,695,339 | B2 | 4/2014 | Spix | |
| 8,794,009 | B2 * | 8/2014 | Glahn | F01D 25/16 60/785 |
| 9,027,536 | B2 | 5/2015 | Pursifull et al. | |
| 9,540,951 | B2 | 1/2017 | Dos Santos et al. | |
| 9,790,856 | B2 * | 10/2017 | Trohel | F04F 5/02 |
| 9,850,779 | B2 | 12/2017 | Gatto et al. | |
| 11,174,766 | B2 | 11/2021 | Herman et al. | |
| 11,512,617 | B2 | 11/2022 | Mincher et al. | |
| 2008/0273992 | A1 * | 11/2008 | Killion | F04F 5/461 417/189 |
| 2013/0177398 | A1 * | 7/2013 | Dos Santos | F02C 7/185 415/116 |
| 2014/0096533 | A1 | 4/2014 | Homeyer et al. | |
| 2019/0120140 | A1 | 4/2019 | Glahn et al. | |

FOREIGN PATENT DOCUMENTS

| | | | | |
|---|---|---|---|---|
| DE | 102017215041 | A1 * | 3/2018 | F01M 13/022 |
| DE | 102017215041 | B4 | 1/2022 | |
| EP | 3020935 | B1 | 1/2019 | |
| WO | 2018041806 | A1 | 3/2018 | |

* cited by examiner

*Primary Examiner* — Eldon T Brockman
(74) *Attorney, Agent, or Firm* — NORTON ROSE FULBRIGHT CANADA LLP

(57) ABSTRACT

An aircraft engine breather system includes a main conduit extending from a fluid-containing component of the aircraft engine to an evacuation location with a venturi between the component and the evacuation location. A suction conduit extending from a seal for the component or for an additional fluid-containing component to a throat of the venturi. A bypass conduit is fluidly coupled to the main conduit at an inlet disposed upstream of the venturi and an outlet disposed downstream of the venturi. The bypass conduit includes a valve having a closed configuration in which fluid flow through the bypass conduit is restricted and an open configuration in which fluid flow through the bypass conduit is allowed. The valve is movable from the closed to the open configuration when a pressure differential through the venturi is at a predetermined pressure differential indicative of the venturi approaching or reaching a choked condition.

20 Claims, 5 Drawing Sheets

BREATHER SYSTEM FOR AIRCRAFT ENGINE

TECHNICAL FIELD

The disclosure relates generally to aircraft engines and, more particularly, to fluid recovery systems in aircraft engines.

BACKGROUND

Aircraft engines, such as gas turbine engines, typically include one or more breather systems for evacuating air from various fluid-containing components of the engine, for instance bearing cavities or gearboxes. These breather systems may also flow leaking fluids, such as oil, from these components to an evacuation location in the engine. While existing breather systems have provided various degrees of success, improvements are sought.

SUMMARY

In one aspect, there is provided a breather system for an aircraft engine, comprising: a main conduit extending from a fluid-containing component of the aircraft engine to an evacuation location, the main conduit including a converging-diverging nozzle between the fluid-containing component and the evacuation location; a suction conduit extending from a seal for the fluid-containing component or for an additional said fluid-containing component to a throat of the converging-diverging nozzle; and a bypass conduit fluidly coupled to the main conduit at a bypass conduit inlet disposed upstream of the converging-diverging nozzle and at a bypass conduit outlet disposed downstream of the converging-diverging nozzle, the bypass conduit including a valve having a closed configuration in which fluid flow through the bypass conduit is restricted and an open configuration in which fluid flow through the bypass conduit is allowed, the valve movable from the closed configuration to the open configuration when a pressure differential through the converging-diverging nozzle is at a predetermined pressure differential, the predetermined pressure differential indicative of the converging-diverging nozzle approaching or reaching a choked condition.

The breather system described above may include any of the following features, in any combinations.

In an embodiment, the seal is a pad mounted to the fluid-containing component or to the additional said fluid-containing component, the pad configured to collect leaking fluid from the fluid-containing component or the additional said fluid-containing component.

In an embodiment, the pad is mounted at a junction between a rotating portion and a static portion of the fluid-containing component or the additional said fluid-containing component.

In an embodiment, the valve is a fluid-activated valve.

In an embodiment, the breather system further includes a plurality of the suction conduit and a plurality of the seal, each of the plurality of the suction conduit extending from a respective one of the plurality of the seal to the throat of the converging-diverging nozzle.

In an embodiment, the valve is configured to return to the closed configuration from the open configuration when the pressure differential through the converging-diverging nozzle drops below the predetermined pressure differential.

In an embodiment, the suction conduit is configured for flowing leaking oil drawn from the seal by the converging-diverging nozzle.

In another aspect, there is provided an aircraft engine, comprising: a gaspath; a fluid-containing component; and a breather system, comprising: a main conduit extending from the fluid-containing component to an evacuation location, the main conduit including a venturi; a suction conduit extending from a seal for the fluid-containing component to a throat of the venturi; and a bypass conduit fluidly coupled to the main conduit at a bypass conduit inlet disposed upstream of the venturi and at a bypass conduit outlet disposed downstream of the venturi, a valve disposed in the bypass conduit, the valve having a closed configuration in which fluid flow through the bypass conduit is restricted and an open configuration in which fluid flow through the bypass conduit is allowed, the valve configured to move from the closed configuration to the open configuration when a pressure differential through the venturi is at a predetermined pressure differential, the predetermined pressure differential indicative of the venturi approaching or nearing a choked condition of the converging-diverging nozzle.

The aircraft engine described above may include any of the following features, in any combinations.

In an embodiment, the seal is a pad mounted to the fluid-containing component, the pad configured to collect leaking fluid from the fluid-containing component.

In an embodiment, the pad is mounted at a junction between a rotating portion of the fluid-containing component and a static portion of the fluid-containing component.

In an embodiment, the valve is a fluid-activated valve.

In an embodiment, the fluid-activated valve is biased towards the open configuration by way of a pressure of the fluid flow through the bypass conduit exerting a force against the fluid-activated valve.

In an embodiment, the valve is configured to return to the closed configuration from the open configuration when the pressure differential through the venturi drops below the predetermined pressure differential.

In an embodiment, the suction conduit is configured for flowing leaking oil drawn from the seal by the venturi.

In an embodiment, the fluid-containing component is a gearbox of the aircraft engine.

In an embodiment, the evacuation location is an exhaust duct of the aircraft engine.

In a further aspect, there is provided a method for operating a breather system in an aircraft engine, comprising: directing a flow of air from a fluid-containing component through a main conduit to an evacuation location via a converging-diverging nozzle disposed in the main conduit; using the flow of air through the converging-diverging nozzle to draw a leaking flow of fluid from a seal of the fluid-containing component or of an additional said fluid-containing component; and when a pressure differential through the converging-diverging nozzle reaches a predetermined pressure differential indicative of a choked state or of a near approaching choked state of the converging-diverging nozzle, opening a valve disposed in a bypass conduit, the bypass conduit providing a fluid flow path bypassing the converging-diverging nozzle.

The method described above may include any of the following features, in any combinations.

In an embodiment, the using the flow of air through the converging-diverging nozzle to draw the leaking flow of fluid from the seal of the fluid-containing component or of the additional said fluid-containing component includes using the flow of air through the converging-diverging nozzle to draw the leaking flow of fluid from a pad mounted to the fluid-containing component or to the additional said fluid-containing component.

In an embodiment, the opening the valve disposed in the bypass conduit includes the fluid biasing a spring-loaded ball in the valve to an open configuration.

In an embodiment, the directing the flow of the air from the fluid-containing component to the evacuation location includes directing the flow of air from the fluid-containing component to an exhaust duct of the aircraft engine.

BRIEF DESCRIPTION OF THE DRAWINGS

Reference is now made to the accompanying figures in which.

DETAILED DESCRIPTION

Figure 1:
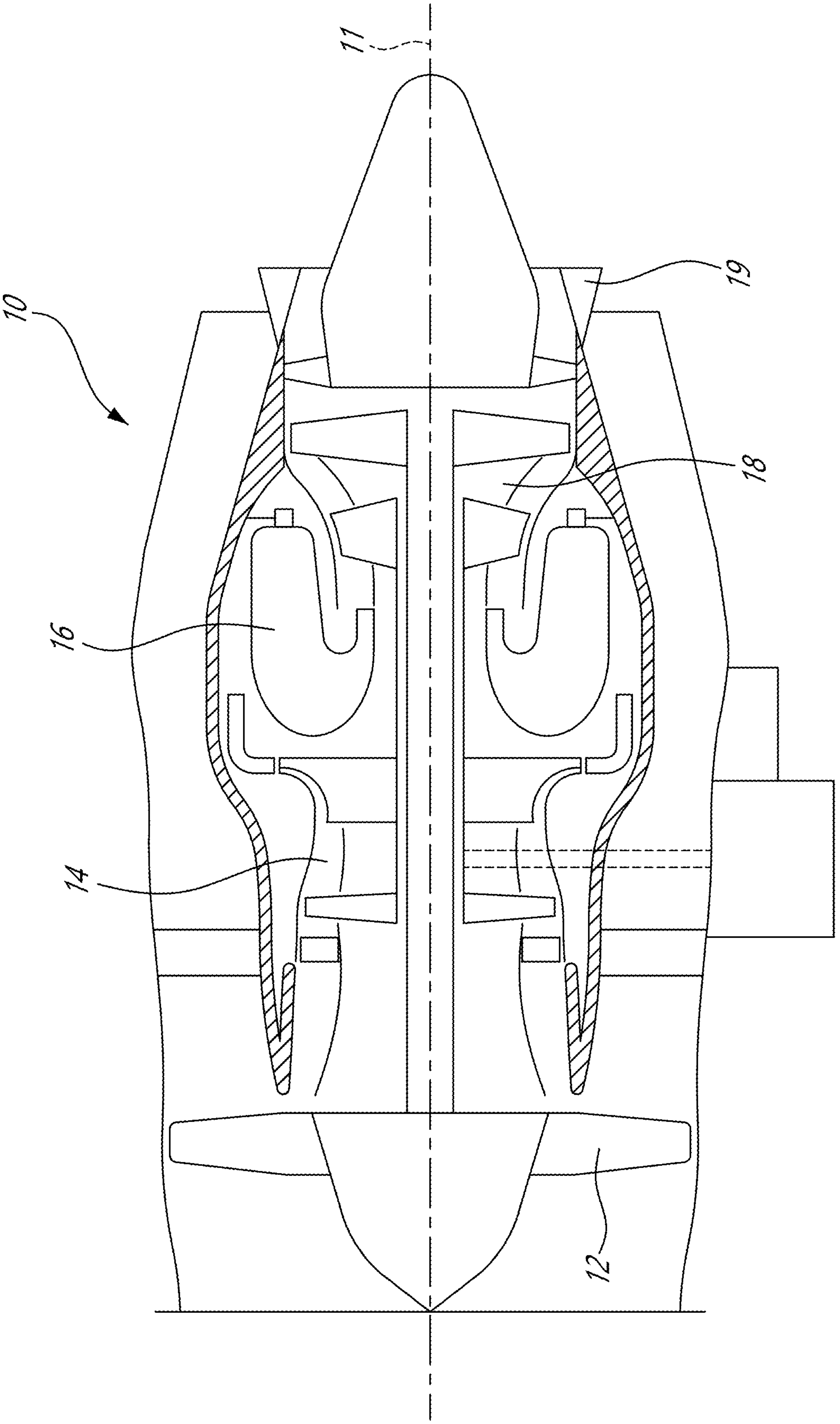
FIG. 1 is a schematic cross sectional view of an aircraft engine exemplified in the form of a gas turbine engine.

FIG. 1 illustrates an example of an aircraft engine. In this example, the engine is a gas turbofan engine 10 of a type preferably provided for use in subsonic flight, generally comprising in serial flow communication, an annular gaspath extending along a central longitudinal axis 11, a fan 12 through which ambient air is propelled, a compressor section 14 for pressurizing the air, a combustor 16 in which the compressed air is mixed with fuel and ignited for generating an annular stream of hot combustion gases, a turbine section 18 for extracting energy from the combustion gases, and an exhaust duct 19 for exhausting the combustion gases from the engine 10. The principles of the present disclosure can be applied to other engines, such as a turboprop engine, a turboshaft engine, and an auxiliary power unit (APU) to name a few.

Figure 2A:
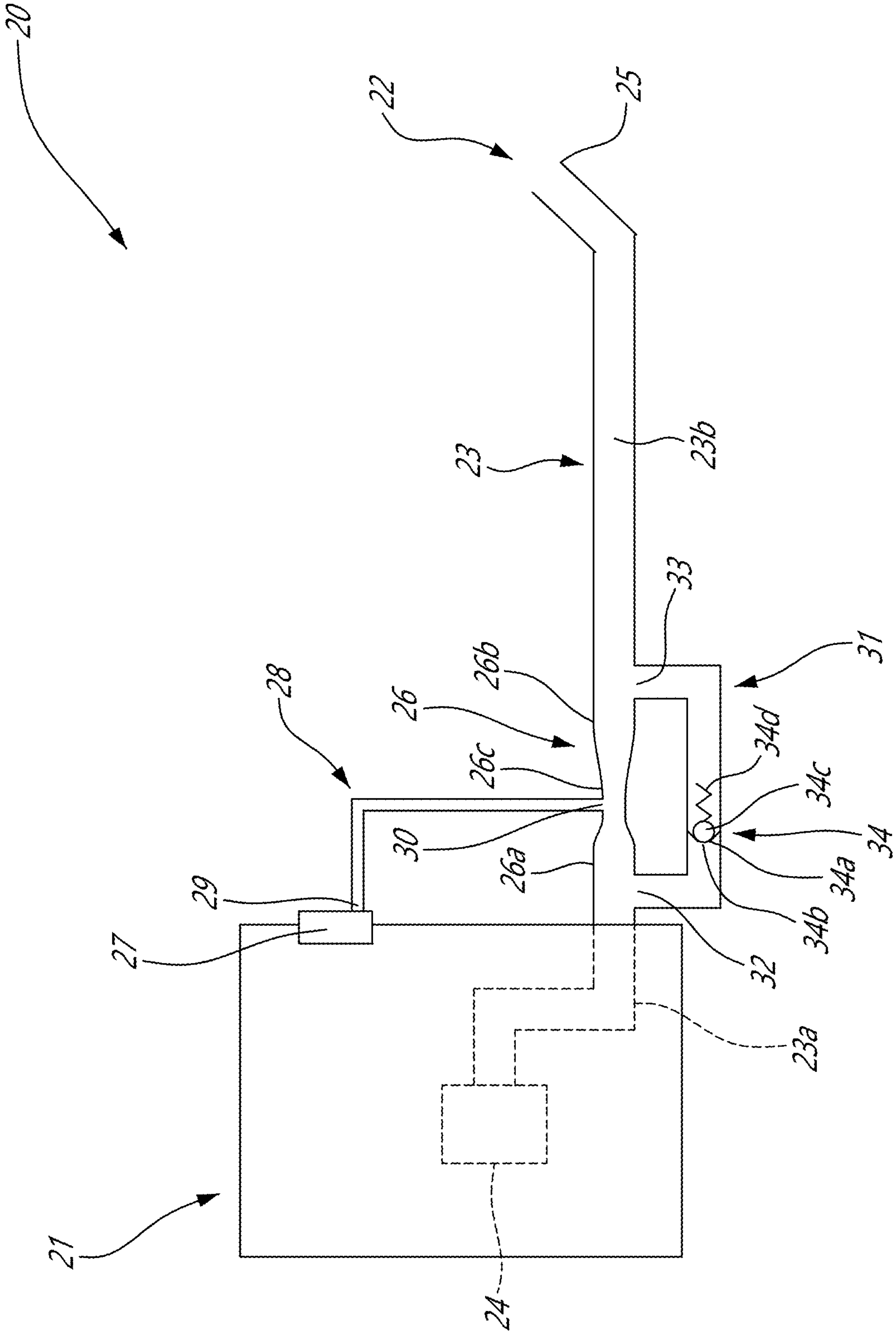
FIGS. 2A-2B are schematic view of a breather system for the engine of FIG. 1 in different engine operating conditions.
Figure 2B:
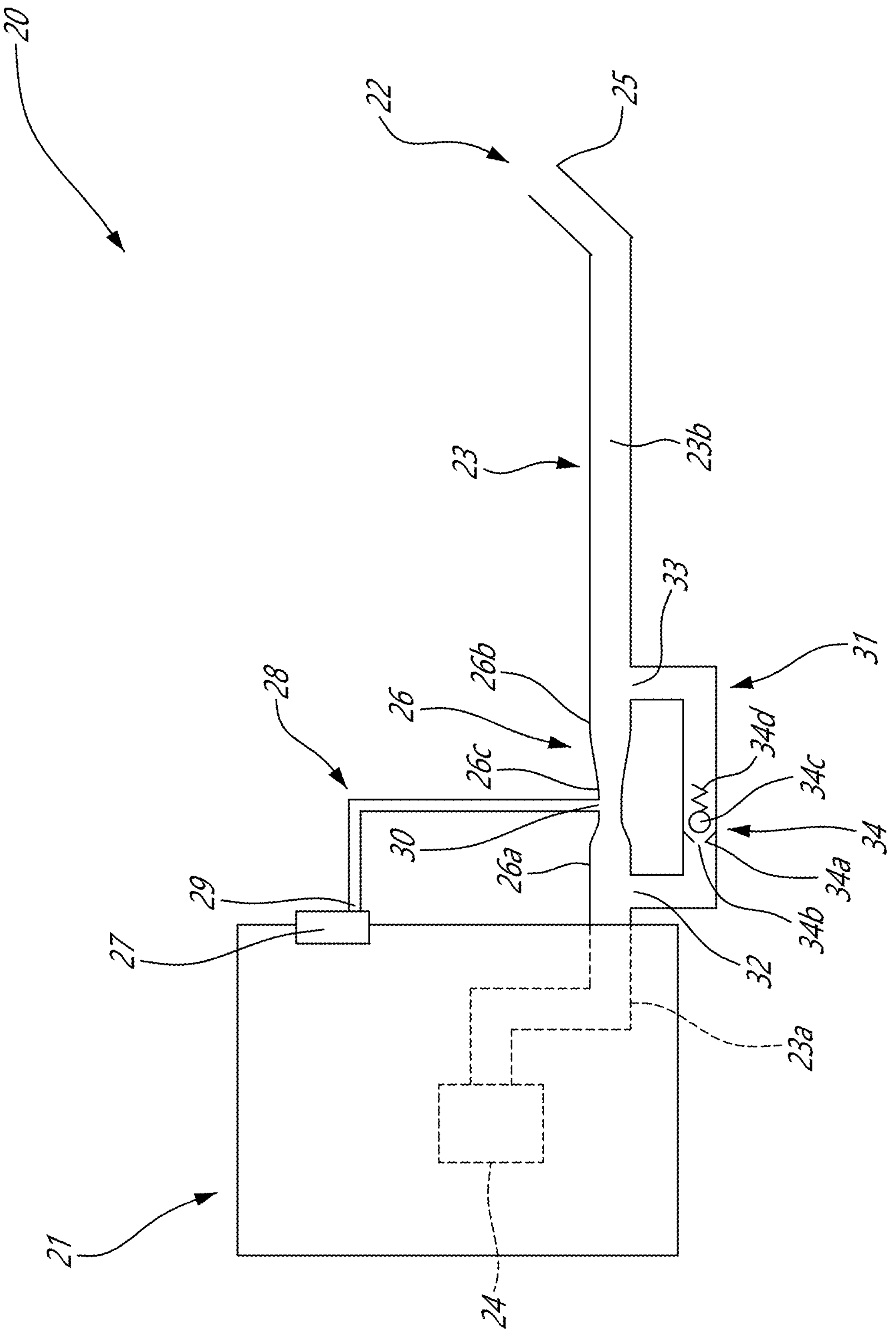

Referring additionally to FIGS. 2A-2B, a breather system 20 for the engine 10 is shown, according to an exemplary embodiment of the present disclosure. The depicted breather system 20 is provided for evacuating air from one or more fluid-containing components 21 of the engine 10, for instance a bearing cavity, a gearbox, or an output shaft, to an evacuation location 22 in the gaspath of the engine 10, for instance, the exhaust duct 19 (see FIG. 1), via a main conduit 23. During typical engine 10 operation, air can be ingested by the one or more fluid-containing components 21. The breather system 20 is thus adapted to evacuate, or blow off, this ingested air. While FIGS. 2A-2B show the breather system 20 to include a single fluid-containing component 21, it is understood that, in various embodiments, the engine 10 can include a plurality of breather systems 20, each adapted to evacuate air from one or more fluid-containing components. The evacuation location is selected, for instance, where pressure is sufficiently low to avoid creating undue back pressure in the various engine fluid systems. In addition, as a quantity of flammable fluid from the fluid-containing components 21 can be present in the evacuated air, it is preferable to direct the evacuated air to a location, such as the exhaust duct 19, where the fluid will burn.

Still referring to FIGS. 2A-2B, the main conduit 23 extends from an inlet 24 in fluid communication with the fluid-containing component 21 to an outlet 25 in fluid communication with the evacuation location 22. The main conduit 23 is partially defined by a converging-diverging nozzle 26, also referred to as a Venturi nozzle, between the inlet 24 and the outlet 25. Illustratively, the converging-diverging nozzle 26 includes a converging section 26*a*, a diverging section 26*b*, and a throat 26*c* (i.e., the location in the converging-diverging nozzle 26 with the lowest diameter) between the converging and diverging sections 26*a*, 26*b*. The converging-diverging nozzle 26 is adapted to create suction through breather system 20, drawing air and fluid towards the outlet 25, as discussed in further detail below. Illustratively, the main conduit 23 is thus formed of an upstream conduit portion 23*a* extending between the inlet 24 and the converging section 26*a* of the converging-diverging nozzle 26, the converging-diverging nozzle 26, and a downstream conduit portion 23*b* extending between the diverging section 26*b* of the converging-diverging nozzle 26 and the outlet 25. In the shown case, the upstream conduit portion 23*a* extends into the fluid-containing component 21, although other configurations are contemplated.

Still referring to FIGS. 2A-2B, the fluid contained within the fluid-containing component 21 is known to leak from a seal 27 sealing the fluid-containing component 21. For instance, in oil-containing components such as bearing cavities and gearboxes, accessory pads are provided to act as seals at junctions between static and rotating components or portions, and are prone to leakage. To collect this leaking fluid and evacuate it in the same manner as the air and fluid collected via the inlet 24, the breather system 20 is provided with an additional conduit 28, also herein referred to as a suction conduit, extending between an inlet 29 in fluid communication with the seal 27 and an outlet 30 in fluid communication with the main conduit 23. In particular, the depicted outlet 30 meets the main conduit 23 at the throat 26*c* of the converging-diverging nozzle 26. As such, the suction provided by the air flowing (i.e., the motive flow) through converging-diverging nozzle 26 draws the leaking fluid (e.g., oil) from the seal 27, through the additional conduit 28, and through the main conduit 23 towards the evacuate location 22. In various embodiments, the main conduit 23 is fluidly coupled to a first fluid-containing component 21 and the additional conduit 28 is fluidly coupled to a seal 27 of an additional fluid-containing component 21. Stated differently, in some embodiments, suction is provided from a different fluid-containing component 21 than the breather system's 20 primary fluid-containing component 21. In various embodiments, the breather system 20 includes a plurality of additional conduits 28 fluidly coupling the main conduit 23 to seals 27 of one or more fluid-containing components 21.

Still referring to FIGS. 2A-2B, the converging-diverging nozzle 26 is configured to provide a sub-atmospheric static pressure at the throat 26*c* throughout various engine operating conditions, thereby promoting fluid drainage from the fluid-containing component 21. The suction provided by the converging-diverging nozzle 26 is dictated, for instance, by the size of the throat 26*c*. While a smaller throat 26*c* can provide increased suction, it is also more susceptible to choking. In addition, when the throat 26*c* is sized to provide sufficient suction under low engine power conditions, the converging-diverging nozzle 26 may be prone to choking under higher power conditions. A choked nozzle 26 may undesirable create additional back pressure in the upstream fluid-containing component 21. In addition, a choked nozzle 26 may increase the static pressure at the throat 26*c* of the converging-diverging nozzle 26, which reduces the suction provided by the converging-diverging nozzle 26.

Still referring to FIGS. 2A-2B, the breather system 20 further includes a bypass conduit 31 fluidly coupled to the main conduit 23. Illustratively, the bypass conduit 31 includes a bypass conduit inlet 32 fluidly coupling the bypass conduit 31 to the main conduit 23 at a location upstream of the converging-diverging nozzle 26, and a bypass conduit outlet 33 fluidly coupling the bypass conduit 31 to the main conduit 23 at a location downstream of the converging-diverging nozzle 26. The bypass conduit 31 thus allows to bypass the converging-diverging nozzle 26 when need be. A valve 34 is provided in the bypass conduit 31, in parallel to the converging-diverging nozzle 26, to selectively allow fluid flow through the bypass conduit 31 based on the condition of the converging-diverging nozzle 26. As such, in cases where the converging-diverging nozzle 26 is in a choked state, the bypass conduit 31 provides an alternate flow path through the main conduit 23, thereby minimizing the risk of additional back pressure in the upstream fluid-containing component 21. Valve 34 can thus be referred to as a pressure relief valve 34. As the valve 34 is movable to its open configuration when the converging-diverging nozzle 26 approaches or reaches a choked state, the bypass conduit 31 is adapted to allow additional fluid flow of the breather system 20.

Still referring to FIGS. 2A-2B, an exemplary valve 34 is shown. The depicted valve 34 is a fluid-activated valve 34, illustratively a spring-loaded ball valve 34 having a plate 34*a* with an aperture 34*b* disposed therethrough, a ball 34*c* positioned to selectively block or unblock the aperture 34*b* by displacing into and out of abutment against the plate 34*a*, and a spring 34*d* coupled to the ball 34*c* and applying a spring force against the ball 34*c* towards the plate 34*a* to bias the valve 34 in a closed position. Other valve 34 types are contemplated. In the shown case, the valve 34 has a closed configuration (shown in FIG. 2A) in which fluid flow through the bypass conduit 31 is restricted or blocked (i.e., fluid flow is not permitted from the bypass conduit inlet 32 to the bypass conduit outlet 33), and an open configuration (shown in FIG. 2B) in which fluid flow through the bypass conduit 31 is allowed (i.e., fluid flow is permitted from the bypass conduit inlet 32 to the bypass conduit outlet 33).

Still referring to FIGS. 2A-2B, as noted above, it is desirable to avoid the effects stemming from a choked converging-diverging nozzle 26, for instance increased upstream back pressure. As such, the valve 34 is movable between its open and closed configurations based on a pressure differential through the converging-diverging nozzle 26, and in particular based on whether the pressure differential through the converging-diverging nozzle 26 is at or below a predetermined pressure differential indicative of the converging-diverging nozzle 26 approaching or reaching a choked condition. When the pressure differential through the converging-diverging nozzle 26 is below the predetermined pressure differential, the unchoked converging-diverging nozzle 26 is adapted to allow fluid flow therethrough without creating increased upstream back pressure, as such, the valve 34 remains closed. When the pressure differential through the converging-diverging nozzle 26 is at the predetermined pressure differential, the valve 34 opens to compensate for the choked converging-diverging nozzle 26 and prevent increased upstream back pressure, as well as limit the static pressure at the throat 26*c* of the converging-diverging nozzle 26. As such, the converging-diverging nozzle 26 (and in particular, the throat 26*c*) can be sized in order to provide strong suction at both low and high engine power conditions, as the valve 34 is openable as the converging-diverging nozzle 26 nears or reaches a choked condition. In some embodiments, the predetermined pressure differential is set to a value inferior to the pressure at which the converging-diverging nozzle 26 is choked, for instance, to ensure the valve 34 moves to its open configuration before the converging-diverging nozzle 26 becomes choked. Other configurations are contemplated. It is understood that the pressure differential referred to herein is a fluid pressure of the flow of fluid through the main conduit 23, with the fluid containing air and/or liquid from the fluid-containing component 21.

In the shown embodiment, the valve 34 is movable between its configurations based on the pressure of the fluid flowing through the bypass conduit 31. As the pressure differential across the converging-diverging nozzle 26 increases, the flow of fluid entering the bypass conduit 31 via the bypass conduit inlet 32 will increase. Illustratively, the spring 34*d* exerts a spring force against the ball 34*c* to bias the ball towards the plate 34*a*, thereby maintaining the valve 34 in its close configuration. The valve 34 is thus tuned so that, as the converging-diverging nozzle 26 approaches its choked state, the flow of fluid entering the bypass conduit 31 will reach a pressure sufficient to exert a force against the ball 34*c*, in a direction opposite the spring force that exceeds the spring force, thereby causing the valve 34 to move to its open configuration. If the pressure differential across the converging-diverging nozzle 26 subsequently decreases, the spring 34*d* is configured to bias the ball 34*c* back towards the plate 34*a*, thereby moving the valve 34 back to its closed configuration (i.e., when the converging-diverging nozzle 26 is no longer approaching its choked condition and the bypassing feature is no longer required). In some embodiments, the valve 34 is configured to open at a pressure differential across the converging-diverging nozzle 26 that is slightly above the pressure differential across the converging-diverging nozzle 26 indicative of non-isentropic losses across the converging-diverging nozzle 26. In an exemplary embodiment, the converging-diverging nozzle 26 typically operates at a pressure differential of 0.1 PSI. The valve 34 can be configured, for instance, to open when the pressure differential across the converging-diverging nozzle 26 reaches 0.15 or 0.2 PSI, i.e., well below a pressure differential indicative of a chocked nozzle 26. Other pressure differentials are contemplated. Such tuning can be achieved, for instance, by selecting a spring with a given size and/or stiffness to achieve a desired spring force. In some cases, the valve 34 is configured to progressively open (i.e., progressively increase the size of the aperture 34*b*) to vary the flow of fluid through the bypass conduit 31 as required. Other tuning configurations are contemplated, for instance, by varying the size of the aperture 34*b* through the plate 34*a*. Other valve 34 configurations are contemplated, for instance, a poppet valve. In another embodiment, valve 34 is an electrically activated valve that is actuated based on readings from a pressure sensor positioned in the main conduit 23 upstream of the converging-diverging nozzle 26.

Figure 3:
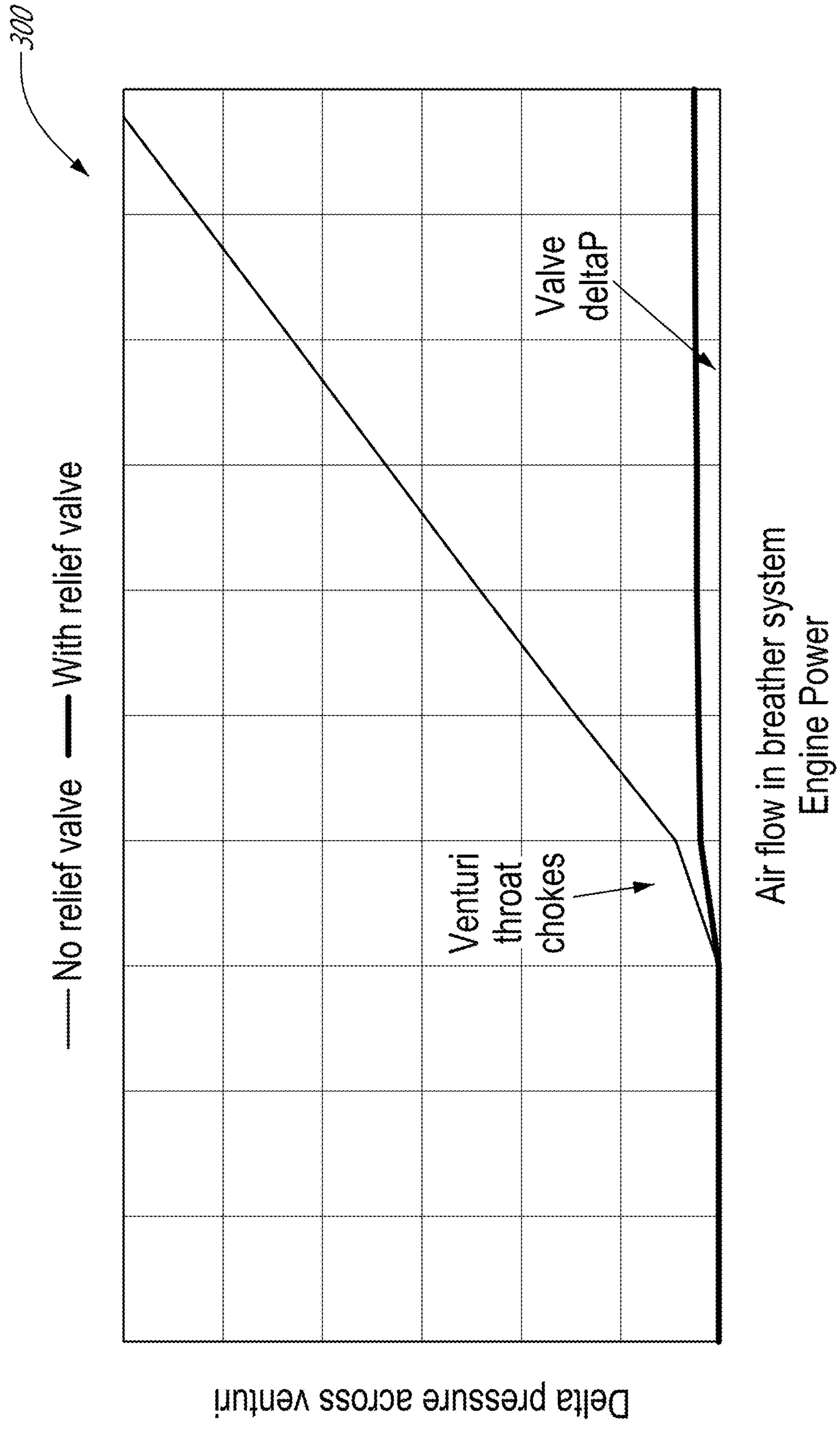
FIG. 3 is a graphical depiction of exemplary pressure differentials through a nozzle of the fluid recovery system of FIG. 2.

Referring additionally to FIG. 3, there is shown at 300 a graphical depiction comparing the pressure differential across converging-diverging nozzle 26 with and without the above-described bypass conduit 31 and valve 34. It is understood that the depiction of a valve-less embodiment is for illustrative purposes to demonstrate the effects provided by the valve 34. As the pressure differential increases across the converging-diverging nozzle 26 towards the choked condition, if the valve 34 were not present, a marked increase in pressure differential would occur, undesirably increasing the upstream back pressure in the fluid-containing component 21. With the valve 34 in place, the valve 34 is configured to open when a slight pressure differential across the converging-diverging nozzle 26 occurs, after which point the pressure differential is maintained at a low level due to the fluid flowing through the bypass conduit 31.

Figure 4:
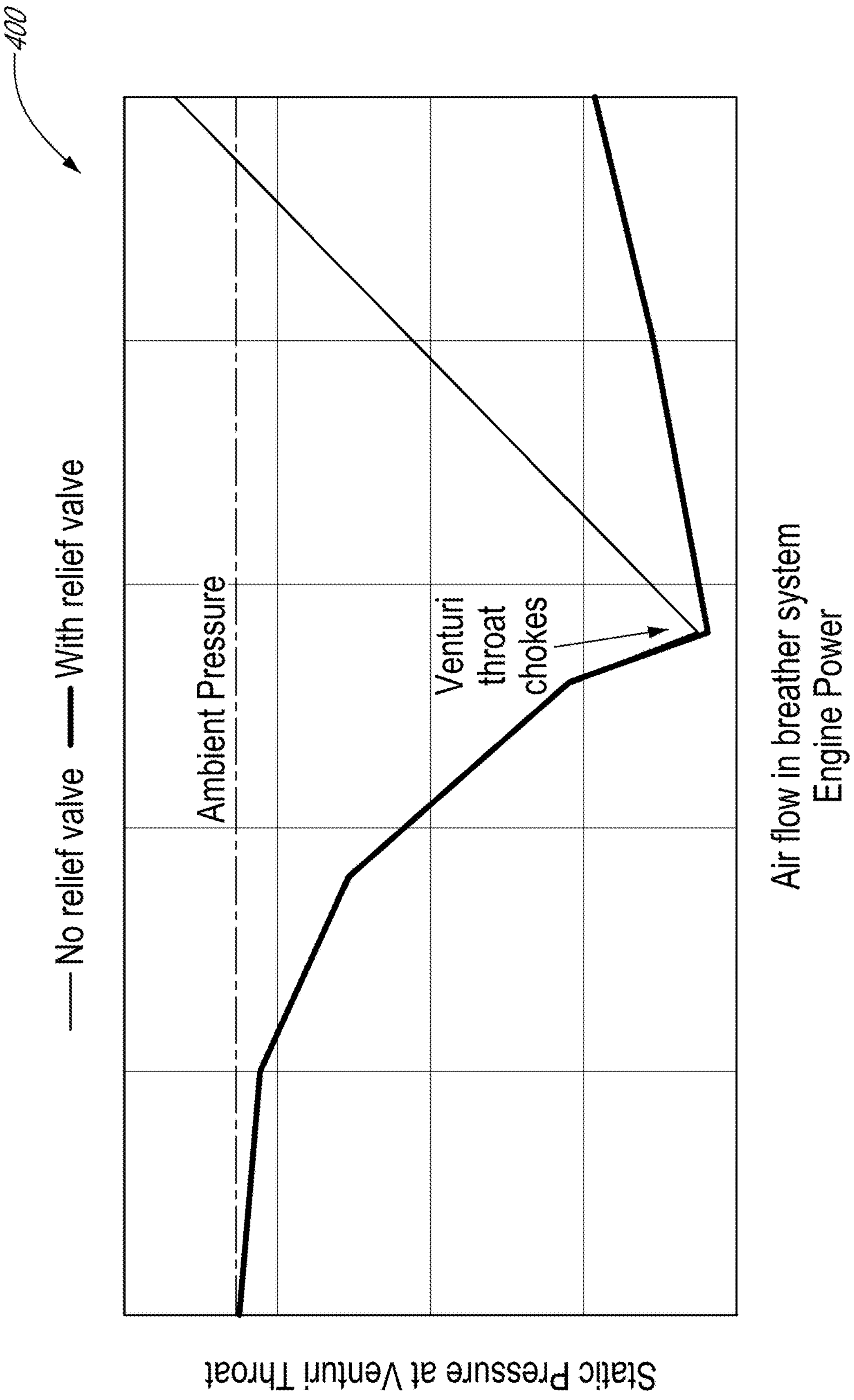
FIG. 4 is a graphical depiction of exemplary static pressures through a nozzle of the fluid recovery system of FIG. 2.

Referring additionally to FIG. 4, there is shown at 400 a graphical depiction comparing the static pressure at the throat 26*c* of the converging-diverging nozzle 26 with and without the above-described bypass conduit 31 and valve 34. As was the case with FIG. 3, it is understood that the depiction of a valve-less embodiment is for illustrative purposes to demonstrate the effects provided by the valve 34. As depicted in FIG. 4, as the fluid flow through the main conduit 23 increases, the static pressure at the throat 26*c* decreases relative to ambient pressure, which is indicative of an increase in suction through the converging-diverging nozzle 26. As the converging-diverging nozzle 26 becomes choked, without the valve 34 and bypass conduit 31, the static pressure at the throat markedly increases, thereby undesirably reducing suction through the converging-diverging nozzle. With the valve 34 in place, as the converging-diverging nozzle 26 reaches a choked condition, the static pressure increases at a much reduced rate in comparison, thereby maintaining a greater degree of suction through the converging-diverging nozzle 26.

According to the present disclosure, there is provided an exemplary method for operating a breather system 20 in an aircraft engine 10. A flow of air is directed from a fluid-containing component 21 through a main conduit 23 to an evacuation location 22 via a converging-diverging nozzle 26 disposed in the main conduit 23. The flow of air through the converging-diverging nozzle 26 is used to draw a leaking flow of fluid from a seal 27 of the fluid-containing component 21. When a pressure differential through the converging-diverging nozzle 26 reaches a predetermined pressure differential indicative of a choked state or of a near approaching choked state of the converging-diverging nozzle 26, a valve 34 disposed in a bypass conduit 32 is opened, the bypass conduit 32 providing a fluid flow path bypassing the converging-diverging nozzle 26. Various additions and modifications to the above-described method are contemplated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A breather system for an aircraft engine, comprising:

a main conduit extending from a fluid-containing component of the aircraft engine to an evacuation location, the main conduit including a converging-diverging nozzle between the fluid-containing component and the evacuation location;

a suction conduit extending from a seal for the fluid-containing component or for an additional of said fluid-containing component to a throat of the converging-diverging nozzle; and a bypass conduit fluidly coupled to the main conduit at a bypass conduit inlet disposed upstream of the converging-diverging nozzle and at a bypass conduit outlet disposed downstream of the converging-diverging nozzle, the bypass conduit including a valve having a closed configuration in which fluid flow through the bypass conduit is restricted and an open configuration in which fluid flow through the bypass conduit is allowed, the valve movable from the closed configuration to the open configuration when a pressure differential through the converging-diverging nozzle is at a predetermined pressure differential, the predetermined pressure differential indicative of the converging-diverging nozzle approaching or reaching a choked condition.

2. The breather system as defined in claim 1, wherein the seal is a pad mounted to the fluid-containing component or to the additional said fluid-containing component, the pad configured to collect leaking fluid from the fluid-containing component or the additional said fluid-containing component.

3. The breather system as defined in claim 2, wherein the pad is mounted at a junction between a rotating portion and a static portion of the fluid-containing component or the additional said fluid-containing component.

4. The breather system as defined in claim 1, wherein the valve is a fluid-activated valve.

5. The breather system as defined in claim 1, further comprising a plurality of the suction conduit and a plurality of the seal, each of the plurality of the suction conduit extending from a respective one of the plurality of the seal to the throat of the converging-diverging nozzle.

6. The breather system as defined in claim 1, wherein the valve is configured to return to the closed configuration from the open configuration when the pressure differential through the converging-diverging nozzle drops below the predetermined pressure differential.

7. The breather system as defined in claim 1, wherein the suction conduit is configured for flowing leaking oil drawn from the seal by the converging-diverging nozzle.

8. An aircraft engine, comprising:

a gaspath;

a fluid-containing component; and a breather system, comprising:

a main conduit extending from the fluid-containing component to an evacuation location, the main conduit including a venturi;

a suction conduit extending from a seal for the fluid-containing component to a throat of the venturi; and a bypass conduit fluidly coupled to the main conduit at a bypass conduit inlet disposed upstream of the venturi and at a bypass conduit outlet disposed downstream of the venturi, a valve disposed in the bypass conduit, the valve having a closed configuration in which fluid flow through the bypass conduit is restricted and an open configuration in which fluid flow through the bypass conduit is allowed, the valve configured to move from the closed configuration to the open configuration when a pressure differential through the venturi is at a predetermined pressure differential, the predetermined pressure differential indicative of the venturi approaching or nearing a choked condition of the converging-diverging nozzle.

9. The aircraft engine as defined in claim 8, wherein the seal is a pad mounted to the fluid-containing component, the pad configured to collect leaking fluid from the fluid-containing component.

10. The aircraft engine as defined in claim 9, wherein the pad is mounted at a junction between a rotating portion of the fluid-containing component and a static portion of the fluid-containing component.

11. The aircraft engine as defined in claim 8, wherein the valve is a fluid-activated valve.

12. The aircraft engine as defined in claim 11, wherein the fluid-activated valve is biased towards the open configuration by way of a pressure of the fluid flow through the bypass conduit exerting a force against the fluid-activated valve.

13. The aircraft engine as defined in claim 8, wherein the valve is configured to return to the closed configuration from the open configuration when the pressure differential through the venturi drops below the predetermined pressure differential.

14. The aircraft engine as defined in claim 8, wherein the suction conduit is configured for flowing leaking oil drawn from the seal by the venturi.

15. The aircraft engine as defined in claim 8, wherein the fluid-containing component is a gearbox of the aircraft engine.

16. The aircraft engine as defined in claim 8, wherein the evacuation location is an exhaust duct of the aircraft engine.

17. A method for operating a breather system in an aircraft engine, comprising:

directing a flow of air from a fluid-containing component through a main conduit to an evacuation location via a converging-diverging nozzle disposed in the main conduit;

using the flow of air through the converging-diverging nozzle to draw a leaking flow of fluid from a seal of the fluid-containing component or of an additional said fluid-containing component; and when a pressure differential through the converging-diverging nozzle reaches a predetermined pressure differential indicative of a choked state or of a near approaching choked state of the converging-diverging nozzle, opening a valve disposed in a bypass conduit, the bypass conduit providing a fluid flow path bypassing the converging-diverging nozzle.

18. The method as defined in claim 17, wherein the using the flow of air through the converging-diverging nozzle to draw the leaking flow of fluid from the seal of the fluid-containing component or of the additional said fluid-containing component includes using the flow of air through the converging-diverging nozzle to draw the leaking flow of fluid from a pad mounted to the fluid-containing component or to the additional said fluid-containing component.

19. The method as defined in claim 17, wherein the opening the valve disposed in the bypass conduit includes the fluid biasing a spring-loaded ball in the valve to an open configuration.

20. The method as defined in claim 17, wherein the directing the flow of the air from the fluid-containing component to the evacuation location includes directing the flow of air from the fluid-containing component to an exhaust duct of the aircraft engine.

* * * * *